US008675730B2

(12) United States Patent
Garg et al.

(10) Patent No.: US 8,675,730 B2
(45) Date of Patent: Mar. 18, 2014

(54) MACROBLOCK GROUPING IN A DESTINATION VIDEO FRAME TO IMPROVE VIDEO RECONSTRUCTION PERFORMANCE

(75) Inventors: Shashank Garg, Maharashtra (IN); Alexey Marinichev, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1057 days.

(21) Appl. No.: 12/501,503

(22) Filed: Jul. 13, 2009

(65) Prior Publication Data
US 2011/0007082 A1    Jan. 13, 2011

(51) Int. Cl.
*H04N 7/12*    (2006.01)

(52) U.S. Cl.
USPC ............. 375/240.01; 375/240.02; 375/240.03

(58) Field of Classification Search
USPC ..................................... 375/240.01
See application file for complete search history.

(56) References Cited

U.S. PATENT DOCUMENTS

| | | | | |
|---|---|---|---|---|
| 5,253,055 A * | 10/1993 | Civanlar et al. | .......... | 375/240.24 |
| 5,329,365 A * | 7/1994 | Uz | ................. | 348/469 |
| 5,440,345 A | 8/1995 | Shimoda | | |
| 5,619,256 A * | 4/1997 | Haskell et al. | .................. | 348/43 |
| 5,694,173 A | 12/1997 | Kimura et al. | | |
| 6,043,846 A * | 3/2000 | Shen et al. | ................. | 348/409.1 |
| 6,111,913 A | 8/2000 | Murdock et al. | | |
| 6,192,145 B1 * | 2/2001 | Anandan et al. | .............. | 382/154 |
| 6,690,836 B2 | 2/2004 | Natarajan et al. | | |
| 6,907,072 B2 | 6/2005 | Kawakatsu et al. | | |
| 7,577,200 B2 * | 8/2009 | Holcomb et al. | ........ | 375/240.16 |
| 7,844,167 B1 * | 11/2010 | McDade et al. | .............. | 386/357 |
| 8,164,629 B1 * | 4/2012 | Zhang | ........................... | 348/155 |
| 8,265,136 B2 | 9/2012 | Hong et al. | | |
| 8,416,857 B2 | 4/2013 | Au et al. | | |
| 2002/0041286 A1 * | 4/2002 | Kamen et al. | ................ | 345/582 |
| 2002/0172283 A1 * | 11/2002 | Kawakatsu et al. | ...... | 375/240.13 |
| 2003/0138042 A1 * | 7/2003 | Chen et al. | ............... | 375/240.03 |
| 2004/0008779 A1 * | 1/2004 | Lai et al. | .................. | 375/240.16 |
| 2004/0066852 A1 * | 4/2004 | MacInnis | ................ | 375/240.25 |
| 2004/0136601 A1 * | 7/2004 | Natarajan et al. | ............. | 382/233 |
| 2005/0084006 A1 * | 4/2005 | Lei et al. | ..................... | 375/240.1 |

(Continued)

FOREIGN PATENT DOCUMENTS

EP    2207357 A1    7/2010

OTHER PUBLICATIONS

Gilvarry et al, Extraction of Motion Vectors from an MPEG Stream, 1999.*

(Continued)

*Primary Examiner* — Mehrdad Dastouri
*Assistant Examiner* — Shan Elahi
(74) *Attorney, Agent, or Firm* — Raj Abhyanker, P.C.

(57) ABSTRACT

A method of video reconstruction includes providing a hardware accelerator to a video processing component of a video processing system, and a driver for the video processing component. In addition, the method includes segmenting macroblocks of a destination video frame in a raster order into groups based on reference parameters thereof using the driver, where the reference parameters define compensation needs of macroblocks of the destination frame. The method also includes constructing an indexed array of linked-lists using the driver, with each linked-list representing macroblocks of a group having the same reference parameters. The hardware accelerator may be programmed to accelerate motion compensation by reconstructing macroblocks of the destination frame group-wise in the indexed order of the array of linked-lists.

26 Claims, 10 Drawing Sheets

(56) References Cited

U.S. PATENT DOCUMENTS

| | | |
|---|---|---|
| 2005/0259729 A1* | 11/2005 | Sun .............................. 375/240.1 |
| 2007/0133692 A1* | 6/2007 | Reddy et al. .............. 375/240.25 |
| 2007/0160137 A1* | 7/2007 | Guo et al. ................... 375/240.1 |
| 2007/0291851 A1 | 12/2007 | Jahanghir et al. |
| 2008/0198934 A1* | 8/2008 | Hong et al. .............. 375/240.22 |
| 2008/0205524 A1 | 8/2008 | Valente |
| 2008/0240254 A1* | 10/2008 | Au et al. ................... 375/240.24 |
| 2009/0296822 A1* | 12/2009 | Sandeep et al. .......... 375/240.24 |
| 2010/0020871 A1* | 1/2010 | Hannuksela et al. .... 375/240.12 |
| 2010/0086052 A1 | 4/2010 | Park et al. |
| 2010/0111183 A1 | 5/2010 | Jeon et al. |
| 2010/0135414 A1 | 6/2010 | Valente |
| 2010/0177824 A1* | 7/2010 | Koo et al. ................. 375/240.16 |
| 2011/0263332 A1* | 10/2011 | Mizrachi ......................... 463/42 |
| 2013/0039415 A1 | 2/2013 | Kim et al. |

OTHER PUBLICATIONS

Zhou et al, State Space Modelling of Dimensional Variation Propagation in Multistage Machining process using Using Differential Motion Vectors, Apr. 2003.*
http://www.cdvp.dcu.ie/Papers/MVector.pdf.

* cited by examiner

| REFERENCE PARAMETER 402 | ENCODED STATES 404 | BIT-ASSIGNMENT 406 |
|---|---|---|
| FIRST REFERENCE SURFACE COPY | INVALID: INTRA-MACROBLOCK<br>CURRENT: TOP FIELD PICTURE TO BOTTOM FIELD PICTURE<br>BACKWARD: BACKWARD ONLY COMPENSATION FOR B-FRAMES<br>FORWARD: FORWARD COMPENSATION FOR B-/P-FRAMES | 00<br>01<br>10<br>11 |
| FIRST REFERENCE SURFACE OFFSET | TOP FIELD<br>BOTTOM FIELD | 0<br>1 |
| SECOND REFERENCE SURFACE AVERAGE | INVALID: INTRA-MACROBLOCK<br>CURRENT: TOP FIELD PICTURE TO BOTTOM FIELD PICTURE<br>BACKWARD: BACKWARD COMPENSATION FOR B-FRAMES<br>FORWARD: DMV COMPENSATION FOR P-FRAMES/FIELDS | 00<br>01<br>10<br>11 |
| SECOND REFERENCE SURFACE OFFSET | TOP FIELD<br>BOTTOM FIELD | 0<br>1 |
| OUTPUT OFFSET | TOP FIELD<br>BOTTOM FIELD | 0<br>1 |
| OUTPUT STRIDE | ONE COMPENSATION<br>TWO COMPENSATIONS | 0<br>1 |

TABLE 400

NON-RASTER ORDER MACROBLOCK
RECONSTRUCTION 700

MACROBLOCK GROUPING IN A DESTINATION VIDEO FRAME TO IMPROVE VIDEO RECONSTRUCTION PERFORMANCE

FIELD OF TECHNOLOGY

This disclosure relates generally to efficient video reconstruction and, more particularly, to a method, apparatus, and a system to realize efficient video reconstruction in media players and/or communication devices by grouping macroblocks of a destination video frame based on reference parameters thereof, the reference parameters defining compensation needs for the aforementioned macroblocks.

BACKGROUND

Three-dimensional (3D) hardware acceleration is important to the rendering of 3D objects such as games. A video frame may be decoded by reconstructing constituent macroblocks thereof in a raster order. Video formats (e.g., MPEG-2 Main Profile at Main Level) may add complexity to a decoding process involving such formats due to the presence of interlaced and field pictures. Macroblocks of a single frame may have differing reference parameters that serve to define compensation requirements thereof.

The difference in reference parameters between macroblocks of a single frame may cause numerous state changes of the 3D hardware, when the 3D hardware is programmed to reconstruct macroblocks of a destination frame in the raster-order. The associated state changes in the 3D hardware may result in degradation in performance that may necessitate hardware changes to improve performance.

SUMMARY

Disclosed are a method and a system to provide efficient video reconstruction in media players and/or communication devices by grouping macroblocks of a destination video frame based on reference parameters thereof, with the reference parameters defining compensation needs of the aforementioned macroblocks.

In general, in one aspect, a method of video reconstruction is disclosed. The method includes providing a hardware accelerator to a video processing component of a video processing system and a driver for the video processing component. In addition, the method includes segmenting macroblocks of a destination video frame in a raster order into groups based on reference parameters thereof using the driver, where the reference parameters define compensation needs of macroblocks of the destination frame. The method also includes constructing an indexed array of linked-lists using the driver, with each linked-list representing macroblocks of a group having the same reference parameters. The hardware accelerator may be programmed to accelerate motion compensation by reconstructing macroblocks of the destination frame group-wise in the indexed order of the array of linked-lists.

In another aspect, a method of grouping macroblocks in a video processing system is disclosed. The method includes dividing macroblocks of a destination frame into groups based on reference parameters thereof, where the reference parameters define compensation needs of macroblocks of the destination frame. The reference parameters include a first reference surface copy, a first reference surface offset, a second reference surface average, a second reference surface offset, an output offset, and a output stride. The first reference surface copy denotes a copy requirement of a macroblock of a first reference frame to a macroblock of the destination frame for compensation. The first reference surface offset denotes a compensation involving copying a top field or a bottom field of the macroblock of the first reference frame when the first reference frame is an interlaced picture encoded as a frame picture or an interlaced picture encoded as a field picture.

The second reference surface average denotes an averaging requirement of the macroblock of the first reference frame with a macroblock of a second reference frame for compensation. The second reference surface offset denotes a compensation involving averaging the top field or the bottom field of the macroblock of the first reference frame with a top field or a bottom field of the macroblock of the second reference frame when the first reference frame and the second reference frame are interlaced frames encoded as frame pictures or interlaced frames encoded as field pictures. The output offset denotes a compensation involving a top field or a bottom field of the macroblock of the destination frame. The output stride denotes a requirement of doubling a stride of each of two macroblocks of even lines and odd lines of an interlaced picture to compensate the macroblock of the destination frame. Doubling the stride is not required for a compensation involving a progressive picture.

In yet another aspect, a video processing system is disclosed. The system includes a video processing component, a hardware accelerator to the video processing component, and a driver for the video processing component. The driver is used to segment macroblocks of a destination video frame in a raster order into groups based on reference parameters thereof. The reference parameters define compensation needs of macroblocks of the destination frame. The driver is used to construct an indexed array of linked-lists, with each linked-list representing macroblocks of a group having the same reference parameters. The hardware accelerator is programmed to accelerate motion compensation by reconstructing macroblocks of the destination frame group-wise in the indexed order of the array of linked-lists.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method and a system to provide efficient video reconstruction in media players and/or communication devices by grouping macroblocks of a destination video frame based on reference parameters thereof, with the reference parameters defining compensation needs of the macroblocks of the destination frame. Although the present embodiments have been described with reference to specific example embodiments, it will be evident that various modifications and changes may be made to these embodiments without departing from the broader spirit and scope of the various embodiments.

In general, example embodiments discussed below provide a non-raster macroblock reconstruction process that may improve performance of a video processing system including the non-raster order macroblock reconstruction process. Examples of video processing systems include, but are not limited to, portable media players and mobile phones.

Various exemplary embodiments will now be described with reference to the accompanying figures.

Figure 1:
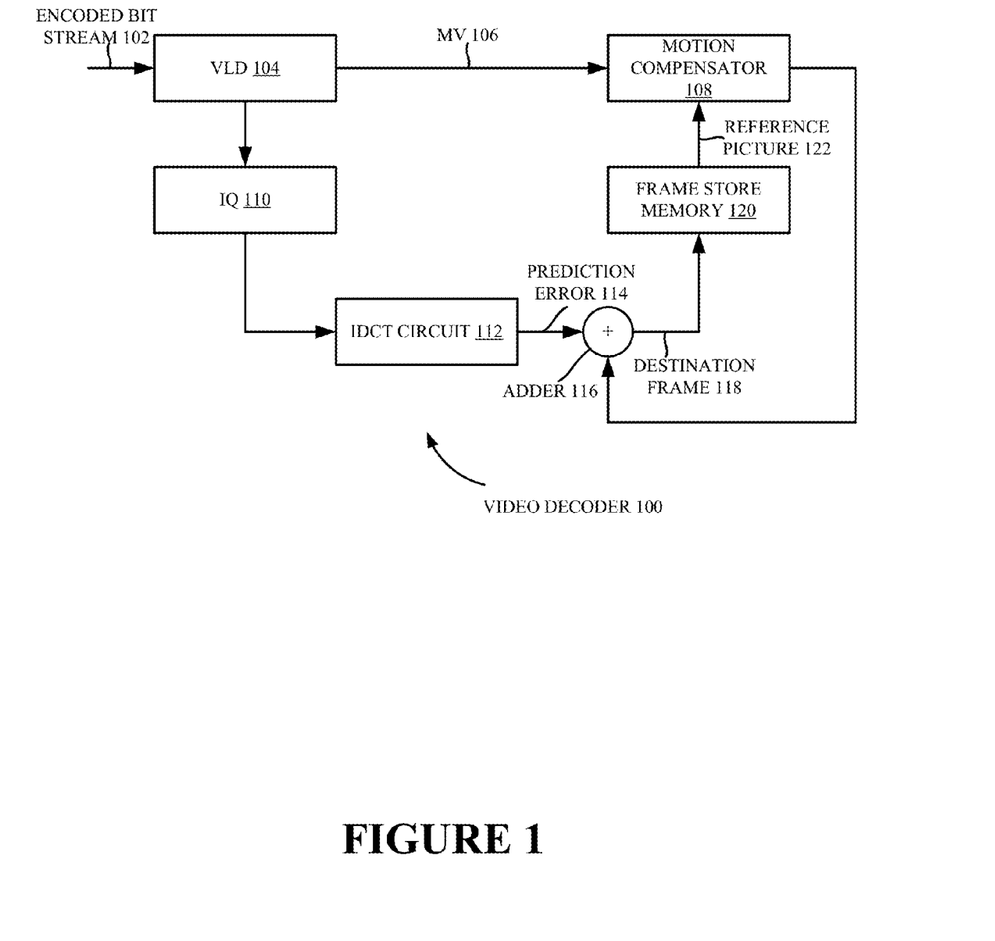
FIG. 1 is a block diagram of a video decoder, in accordance with one or more embodiments.

FIG. 1 is a block diagram of a video decoder 100. Particularly, FIG. 1 illustrates a video decoder 100 that includes a Variable Length Decoder (VLD) 104, an Inverse Quantizer (IQ) 110, an Inverse Discrete Cosine Transform (IDCT) circuit 112, an adder 116, a frame store memory 120, and a motion compensator 108. The VLD 104 may receive an encoded data stream 102 representing, for example, Huffman/Run-Level coded quantized Discrete Cosine Transform (DCT) coefficients as an input. The quantized DCT coefficients, in turn, may represent macroblocks of a picture. Therefore, the encoded data stream 102 input to the VLD 104 may also include motion vector (MV) data and information indicating the type of picture (e.g., intra-coded (I-) pictures, predictive (P-) pictures or bi-predictive (B-) pictures). The quantized DCT coefficients may be fed to the IQ 110 that performs an inverse quantization process on the coefficients. Following the inverse quantization process, the scaled coefficients may be passed through an IDCT circuit 112 that transforms a block of coefficients to a prediction error 114 block of pixels. A series of blocks may allow for an entire prediction error 114 macroblock to be decoded.

The MV 106 data may be parsed from the data stream and sent to the motion compensator 108. In the case of P- and B-pictures, the MV 106 data may be used to read a predicted macroblock out of a stored reference picture 122 in the frame store memory 120. The motion compensator output, which is the predicted macroblock, may be added to the prediction error 114 macroblock to generate a reconstructed macroblock of a destination frame 118. In the case of I-pictures, no motion vectors and no reference pictures are required and, hence, the prediction of the motion compensator 108 may not be required. An intra-macroblock may merely be copied from an IDCT buffer. In the case of P- and B-pictures, the output of the adder 116 may be stored as a reference macroblock, and, hence, a reference picture 122, in the frame store memory 120 for future predictions.

The process of macroblock reconstruction may occur in a raster direction through a software program on the Central Processing Unit (CPU) instructing a three-dimensional (3D) hardware as to a specific location in the destination frame to which a macroblock of a reference frame needs to be copied. The aforementioned copying may involve the provision of a source pointer and a destination pointer in the memory, and the 3D hardware may need to be instructed to copy a requisite block of pixels from the source location to the destination location. This may free the CPU for other tasks, and the actual copying of blocks of pixels may be taken over by the 3D hardware. The 3D hardware may be a graphics accelerator. For example, the 3D hardware may be a 3D pixel shader. Pixel shaders are dedicated Arithmetic Logical Units (ALUs) that may be programmed to perform computation-intensive pixel-shading operations in 3D graphics.

Figure 2:
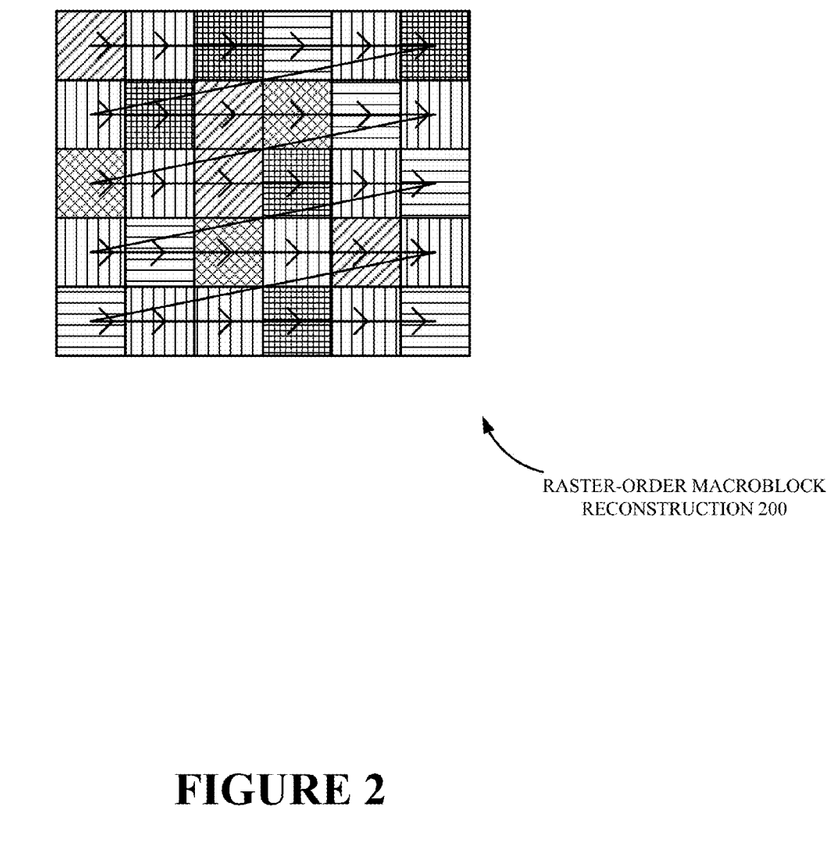
FIG. 2 is a schematic of a raster-order macroblock reconstruction process, in accordance with one or more embodiments.

FIG. 2 shows a schematic of a raster-order macroblock reconstruction 200 process. As seen in FIG. 2, macroblocks of a video frame are traversed in a sequential line-by-line order. Compensation requirements for individual macroblocks of a frame may be different. For example, a first macroblock may be reconstructed from two blocks with even and odd lines, and a second macroblock may be reconstructed from a macroblock as a whole, where there is no question of even and odd lines (e.g., progressive pictures). Reference parameters for compensation such as macroblock stride and macroblock offset may change from one macroblock to the other, leading to changes in 3D hardware states during compensation of a frame. The aforementioned state changes may necessitate programming the 3D hardware repeatedly. The compensations may also include a lot of repetitions due to reference parameters being the same for numerous macroblocks of the destination frame. In the worst case, the number of state changes may equal the number of macroblocks.

Figure 3:
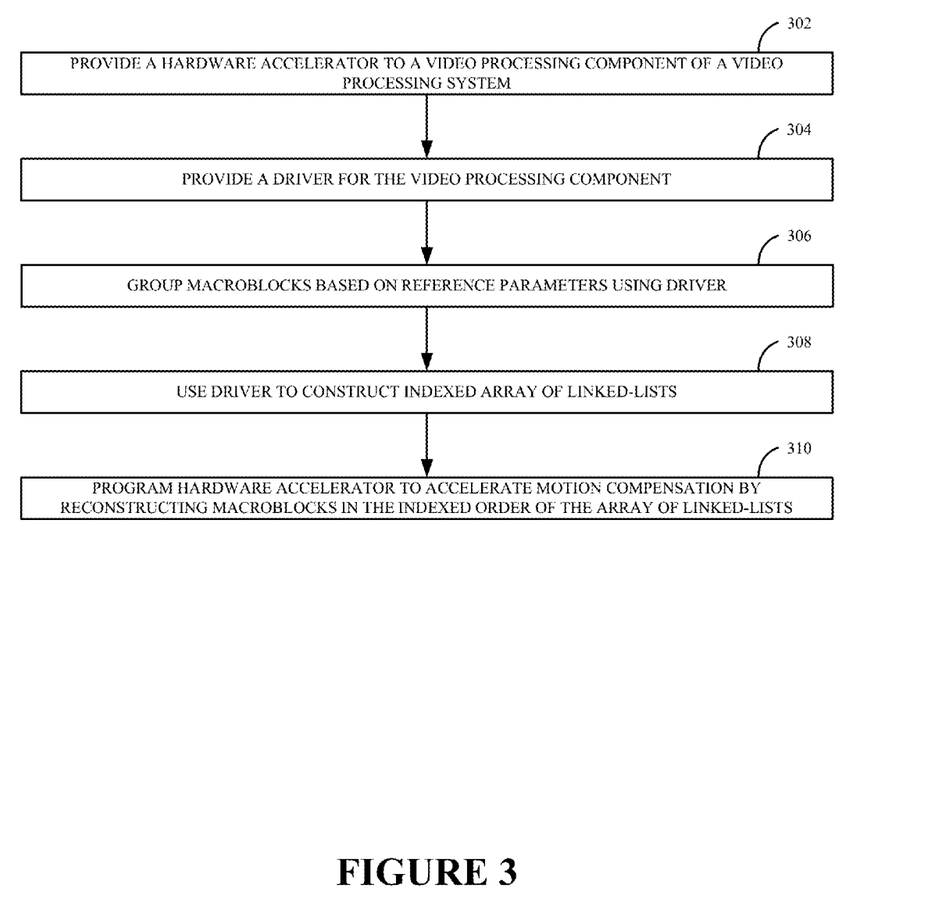
FIG. 3 is a process flow diagram detailing the operations involved in a non-raster order macroblock reconstruction process, in accordance with one or more embodiments.

FIG. 3 shows a process flow detailing the operations involved in a non-raster order macroblock reconstruction process, in accordance with one or more embodiments. In operation 302, a hardware accelerator to a video processing component of a video processing system may be provided. In one or more embodiments, the hardware accelerator may be a graphics accelerator (e.g., a 3D pixel shader). In operation 304, a driver for the video processing component may be provided. In one or more embodiments, the driver may be a device driver that interfaces with a graphics card. Operation 306 may involve using the driver to segment macroblocks of a destination frame in a raster order into groups based on reference parameters that define compensation needs of macroblocks of the destination frame. Operation 308 may involve constructing an indexed array of linked-lists using the driver, where each linked-list represents macroblocks of a group having the same reference parameters. Finally, operation 310 may involve programming the hardware accelerator to accelerate motion compensation by reconstructing macroblocks of the destination frame group-wise in the indexed order of the array of linked-lists.

In one or more embodiments, performance degradation in the raster-order macroblock reconstruction process of FIG. 2 may be reduced as the 3D hardware does not change a state thereof until all compensations for a previous state are completed for the destination frame. The aforementioned previous state denotes a group of macroblocks having the same reference parameters.

The non-raster macroblock reconstruction process and the segmenting of macroblocks into groups, as shown in FIG. 3, may be applicable to a plurality of video formats (e.g., MPEG-2, H.264, MPEG-4, MPEG-1), and, therefore, the exemplary embodiments are not limited to particular video formats.

Figure 4:
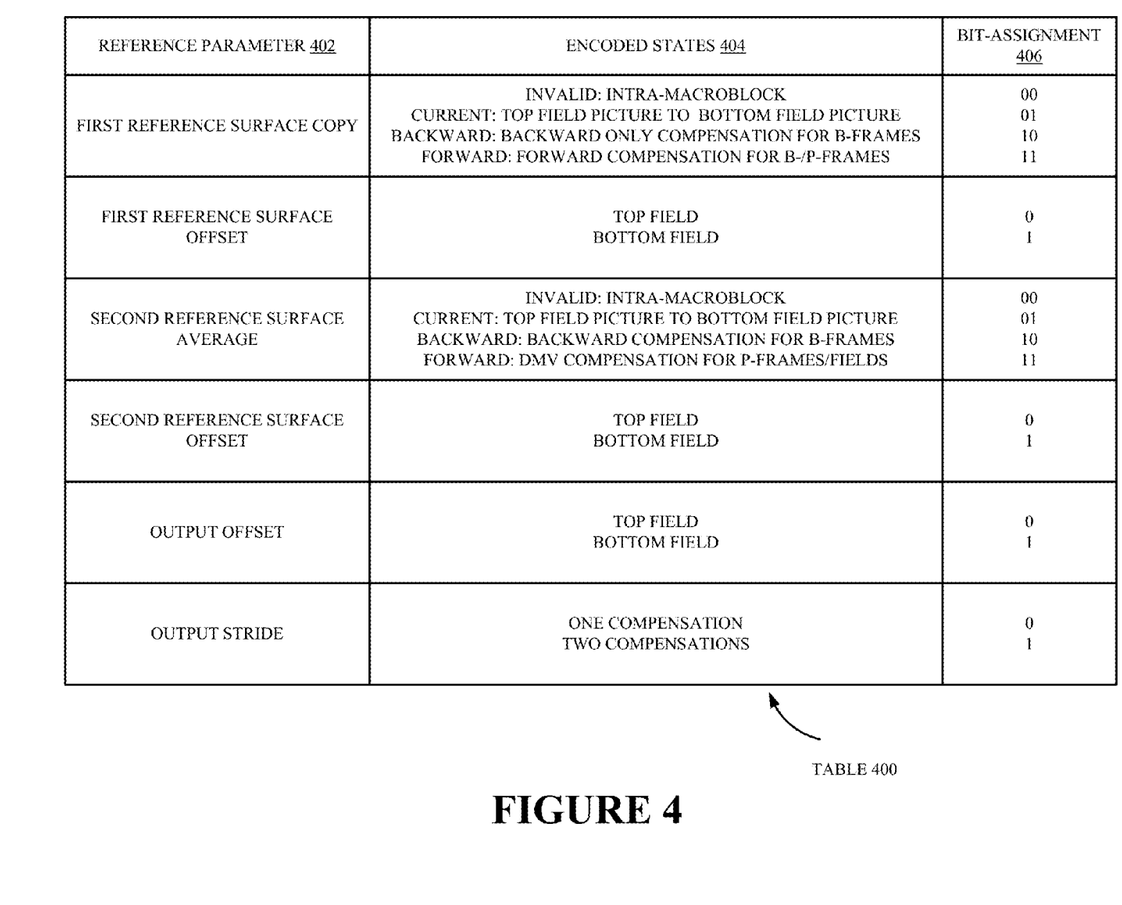
FIG. 4 is a table including the reference parameters for macroblock reconstruction, in accordance with one or more embodiments.

FIG. 4 shows a table 400 including the reference parameters for macroblock compensation, in accordance with one or more embodiments. Particularly, the table 400 includes reference parameters 402, encoded states 404 associated with the reference parameters, and bit-assignments 406 associated with the encoded states 406. The reference parameters 402 are particularly suited to MPEG-2 video decoding, as an example, but may be employed in the decoding of any video format.

The first reference surface copy parameter denotes a copy requirement of a macroblock of a first reference frame to a macroblock of a destination frame. The first reference surface copy parameter may include four possible states described as follows.

(a) An invalid state—The invalid state may refer to an intra-macroblock compensation. As intra-macroblocks do not require reference frames, the invalid state may refer to intra-macroblock compensation not requiring a copy from a macroblock of the first reference frame to the macroblock of the destination frame. In one or more embodiments, intra-macroblock compensation may be accomplished by merely copying from an IDCT buffer in the decoder chain.

(b) A current state—The current state may refer to a compensation need in the case of field pictures, where a top field picture including even lines of a frame or a bottom field picture including odd lines of a frame may be used to copy compensate the corresponding bottom field picture or the top field picture in a current frame. In one or more embodiments, the top field picture may be in a temporal past or a temporal future relative to the current frame, and the bottom field picture may be in the corresponding temporal future or the temporal past relative to the current frame.

(c) A backward-only compensation state for B-frames—The backward only compensation requirement for B-frames indicates a compensation, where a macroblock of the destination B-frame may be copy compensated using a macroblock of the first reference frame. Here, the macroblock of the first reference frame may be in a temporal future relative to the macroblock of the destination B-frame.

(d) A forward compensation state for B-/P-frames—The forward compensation state indicates a compensation, where a macroblock of a destination B-/P-frame may be copy compensated using a macroblock of the first reference frame in a temporal past relative to the macroblock of the destination B-/P-frame.

In one or more embodiments, the abovementioned first reference surface copy parameter may be assigned two bits indicating the four possible states (00, 01, 10, and 11 as shown in FIG. 4) for encoding purposes. In one or more embodiments, the forward compensation and the backward compensation may involve motion vectors representing macroblocks of P-/B-frames. The motion vectors may point from macroblocks of the P-/B-frames to the reference frame.

The first reference surface offset parameter denotes a compensation involving copying a top field or a bottom field of a macroblock of the first reference frame. Here, the first reference frame may be an interlaced picture encoded as a frame picture or a field picture. In one or more embodiments, as the offset denotes a difference between the even fields and the odd fields of an interlaced frame, the first reference surface offset parameter may be assigned one bit. The one bit indicates even lines or odd lines in an interlaced picture being compensated for encoding purposes. For example, top field compensation may be assigned a 0, and the bottom field compensation may be assigned a 1, as shown in FIG. 4.

The second reference surface average parameter denotes an averaging requirement of a macroblock of the first reference frame with a macroblock of a second reference frame for compensation purposes. The second reference surface average parameter may include four possible states described as follows.

(a) An invalid state—The invalid state may refer to an intra-macroblock compensation. As intra-macroblocks do not require reference frames, the invalid state may refer to intra-macroblock compensation not requiring an averaging of a macroblock of the first reference frame with the macroblock of the second reference frame. The invalid state may also refer to a lack of need of the second reference frame in cases where the first reference frame may suffice.

(b) A current state—The current state may refer to a compensation need in the case of field pictures, where a top field picture including even lines of a frame or a bottom field picture including odd lines of a frame may be used to compensate the corresponding bottom field picture or the top field picture in a current frame by averaging. In one or more embodiments, the top field picture may be in a temporal past or a temporal future relative to the current frame, and the bottom field picture may be in the corresponding temporal future or the temporal past relative to the current frame.

(c) A backward compensation state for B-frames—The backward compensation requirement for B-frames, here, indicates a compensation, where a macroblock of a destination B-frame is compensated using averaging of a macroblock of the first reference frame in a temporal past or a temporal future relative to the macroblock of the destination frame and a macroblock of the second reference frame in the corresponding temporal future or the temporal past relative to the macroblock of the destination frame. The backward compensation, as discussed above, may involve MVs pointing from the macroblock of the destination frame to macroblocks of the B-frames.

(d) A forward differential motion vector (DMV) compensation for P-frames/fields—The forward DMV compensation requirement indicates a compensation, where a macroblock of a destination P-frame may be compensated using a macroblock of the first reference frame and a macroblock of the second reference frame both in a temporal past relative to the macroblock of the destination P-frame. For the aforementioned compensation, a DMV may be added to a MV pointing from the macroblock of the destination P-frame to the macroblock of the reference frame spatially nearest to the macroblock of the P-frame. This may enable the macroblock of the destination frame to point to the macroblock of the reference frame spatially farthest to the macroblock of the destination frame. Interlaced frame pictures and field pictures may also be compensated using the forward DMV compensation.

In one or more embodiments, the abovementioned second reference surface average parameter may be assigned two bits indicating the four possible states (00, 01, 10, and 11 as shown in FIG. 4) for encoding purposes.

The second reference surface offset parameter denotes a compensation involving averaging a top field or a bottom field of a macroblock of the first reference frame with the top field or the bottom field of the macroblock of the second reference frame. Here, the first reference frame and the second reference frame may both be interlaced pictures encoded as frame pictures or field pictures. In one or more embodiments, as the offset denotes a difference between the even fields and the odd fields of an interlaced frame, the second reference surface offset parameter may be assigned one bit indicating even lines or odd lines in an interlaced picture being compensated for encoding purposes. For example, top field compensation may be assigned a 0, and the bottom field compensation may be assigned a 1, as shown in FIG. 4.

The output offset parameter, similarly, may denote a compensation involving a top field or a bottom field of the macroblock of the destination frame. In one or more embodiments, the output offset parameter may be assigned one bit indicating even lines or odd lines of the macroblock of the destination frame being compensated. For example, top field compensation may be assigned a 0, and the bottom field compensation may be assigned a 1, as shown in FIG. 4.

The output stride parameter may denote a compensation, where doubling the stride of each of two macroblocks of even and odd lines of an interlaced picture may be required to compensate one macroblock in the destination frame. Considering 16×16 sample macroblocks as an example, two 16×8 sample macroblock compensations may be required for one macroblock in the destination frame. In the case of progressive pictures, the output stride parameter may be ruled out as one 16×16 sample macroblock alone may compensate the macroblock in the destination frame. In one or more embodiments, the output stride parameter may be assigned one bit indicating compensations involving interlaced pictures or progressive pictures.

The six reference parameters described above may completely define macroblock compensation for any destination frame including progressive, interlaced and/or field pictures. In one or more embodiments, the aforementioned six reference parameters may be assigned 8-bits in total for encoding purposes. The unique combinations of the bits in the bit-fields may decide groups to which macroblocks of the destination frame belong. In one or more embodiments, the bit encoding may allow for the rendering of macroblocks of the destination frame group-by-group rather than in a raster order.

More than six reference parameters may be used to group macroblocks in a video standard that requires more than six reference parameters. The abovementioned reference parameters merely serve as example choices to group macroblocks in order to convenience non-raster macroblock reconstruction in the destination frame. New reference parameters defining compensation needs are well within the scope of the embodiments. Reference parameters may also be less than six in one or more embodiments.

Figure 5A:
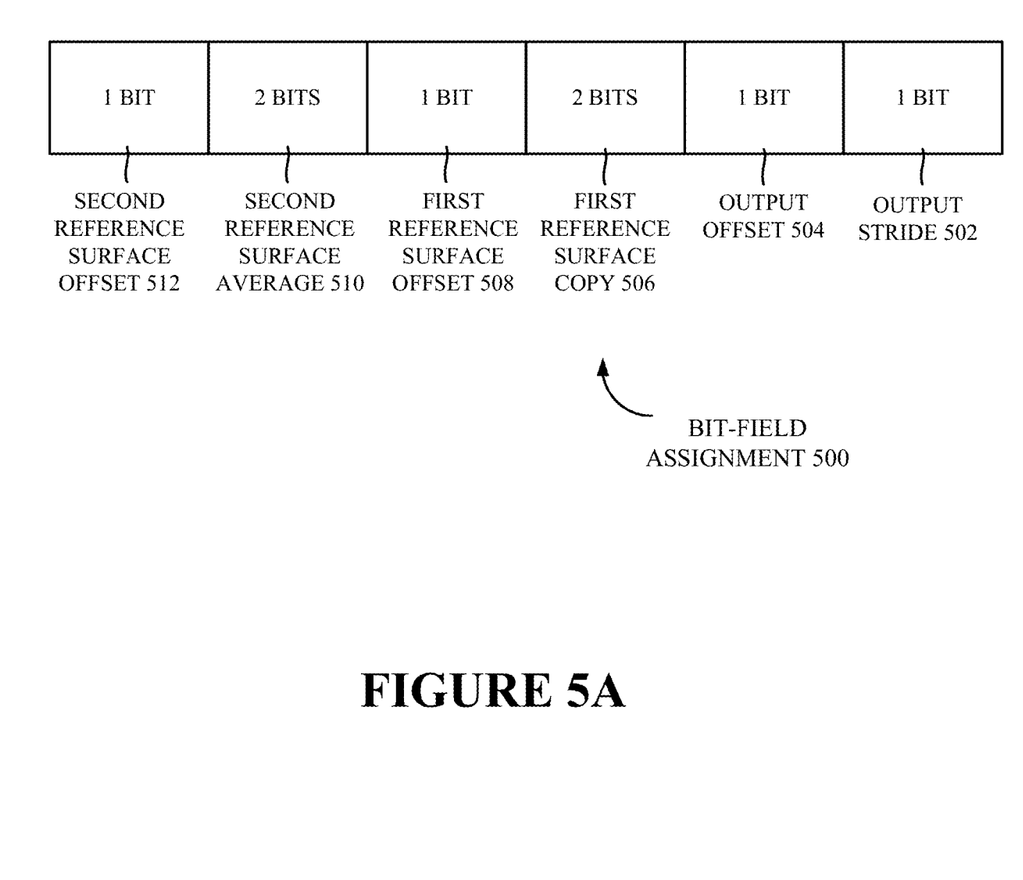
FIG. 5A is an illustration of bit-field assignments for the reference parameters, in accordance with one or more embodiments.

FIG. 5A shows the bit-field assignments 500 for the reference parameters, in accordance with one or more embodiments. As discussed above, the first reference surface copy 506 and the second reference surface average 510 may be assigned two bits each, and the first reference surface offset 508, the second reference surface offset 512, the output offset 504, and the output stride 502 may be assigned one bit each. FIG. 5A is merely an example arrangement of reference parameters. The reference parameters may be combined in any order to encode the groups to which macroblocks of the destination frame may belong to.

Figure 5B:
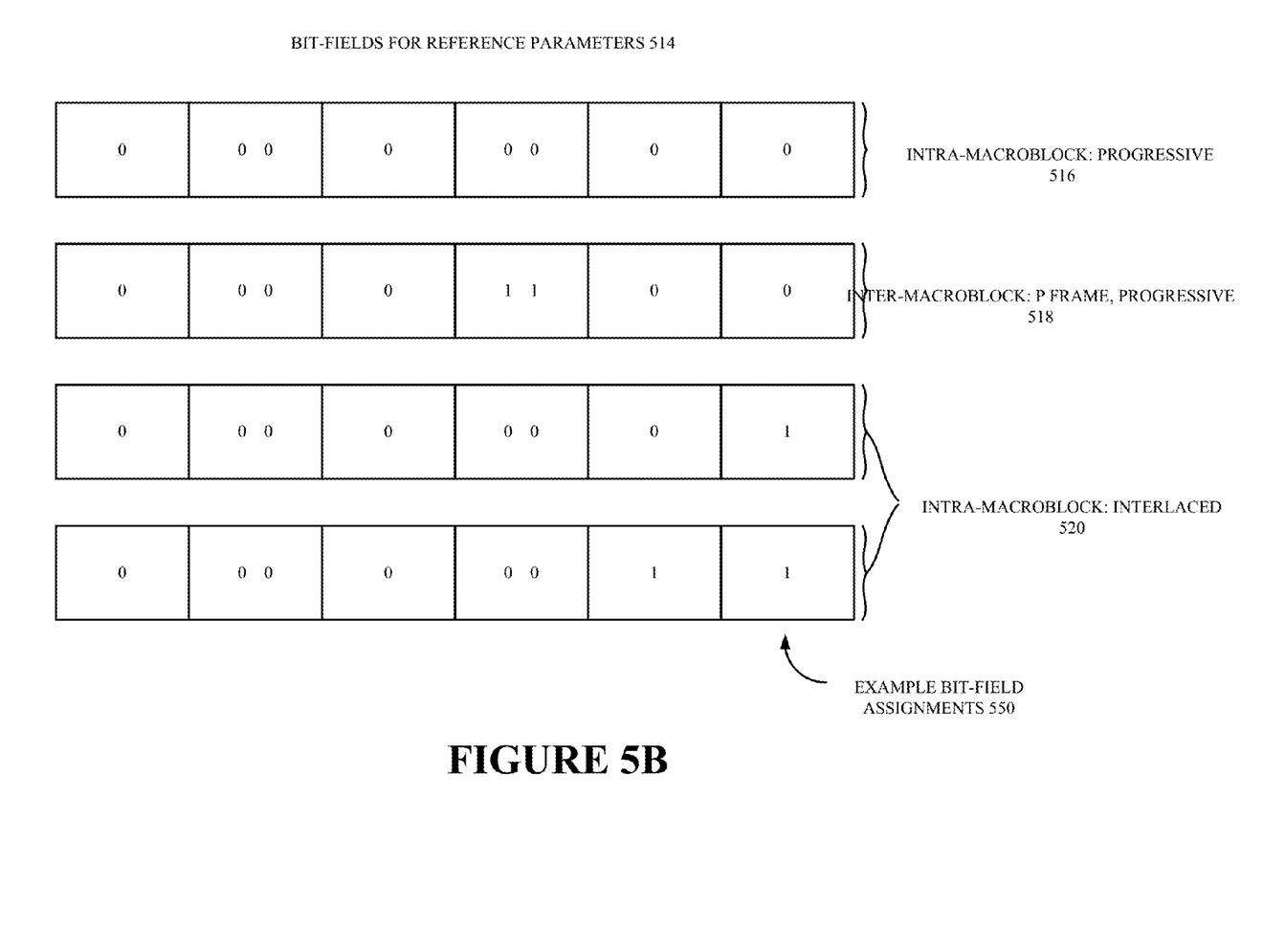
FIG. 5B is an example illustration of bit-field assignments, in accordance with one or more embodiments.

FIG. 5B shows example bit-field assignments 550, in accordance with one or more embodiments. In the case of an intra-macroblock compensation for progressive frames (intra-macroblock: progressive 516), the output stride may be a 0 because of there being no question of even lines and odd lines, and the output offset again may be a 0. As the compensation occurs in intra-macroblocks, first reference surface copy 506, first reference surface offset 508, second reference surface average 510, and second reference surface offset 512 hold no meaning, and are 00, 0, 00, and 0 respectively. Therefore, 00000000 is the bit-assignment as shown in FIG. 5B. Converting to the decimal notion, intra-macroblock compensation for progressive frames may be encoded as a 0.

In the case of an intra-macroblock compensation for interlaced frames (intra-macroblock: interlaced 520), two possibilities may exist due to the presence of top fields and bottom fields. Two compensations may be needed for even lines and odd lines, and, therefore, the output stride in both cases may be assigned a 1 state. Output offset 504 in one case may be 0 for top field compensation, and 1 in the other case of bottom field compensation. The two compensations may be represented by 00000001 and 00000011 respectively. Converting to the decimal notation, the intra-macroblock compensation for interlaced frames may be encoded as a 1 and a 3.

It is to be noted that there may be certain combinations that may be impossible to conceive (e.g., 00000010, i.e., the decimal notation 2, as the output offset cannot be a 1 when the output stride is 0).

In the case of an inter-macroblock compensation for progressive pictures in a destination P-frame (inter-macroblock: P-frame, progressive 518), the output stride 502 and the output offset 504 may be 0 as per the norm for progressive pictures. The first reference surface copy 506 parameter may be represented as a 11, which represents the forward compensation for P-frames. The first reference surface offset 508 may be represented as a 0 as per the norm for progressive pictures. The second reference surface average 510 parameter and the second reference surface offset 512 parameter hold no meaning, and may be represented as 00 and 0 respectively. Therefore, the aforementioned compensation may be represented as 00001100. Converting to the decimal notation, the compensation may be encoded as a 12.

All possible combinations may be worked out in the manner described above, beginning from a decimal 0 to a possible decimal 255. As mentioned above, some of the combinations may not be possible, leading to the total number of possible combinations being less than $2^8$ (256). In one or more embodiments, the actual number of groups that represent bit combinations having macroblocks with the same reference parameters, may be approximately 20 in a practical case. In one or more embodiments, the abovementioned binary and decimal notations for encoding purposes may be modified to another set of appropriate notations (e.g., hexadecimal).

Figure 6A:
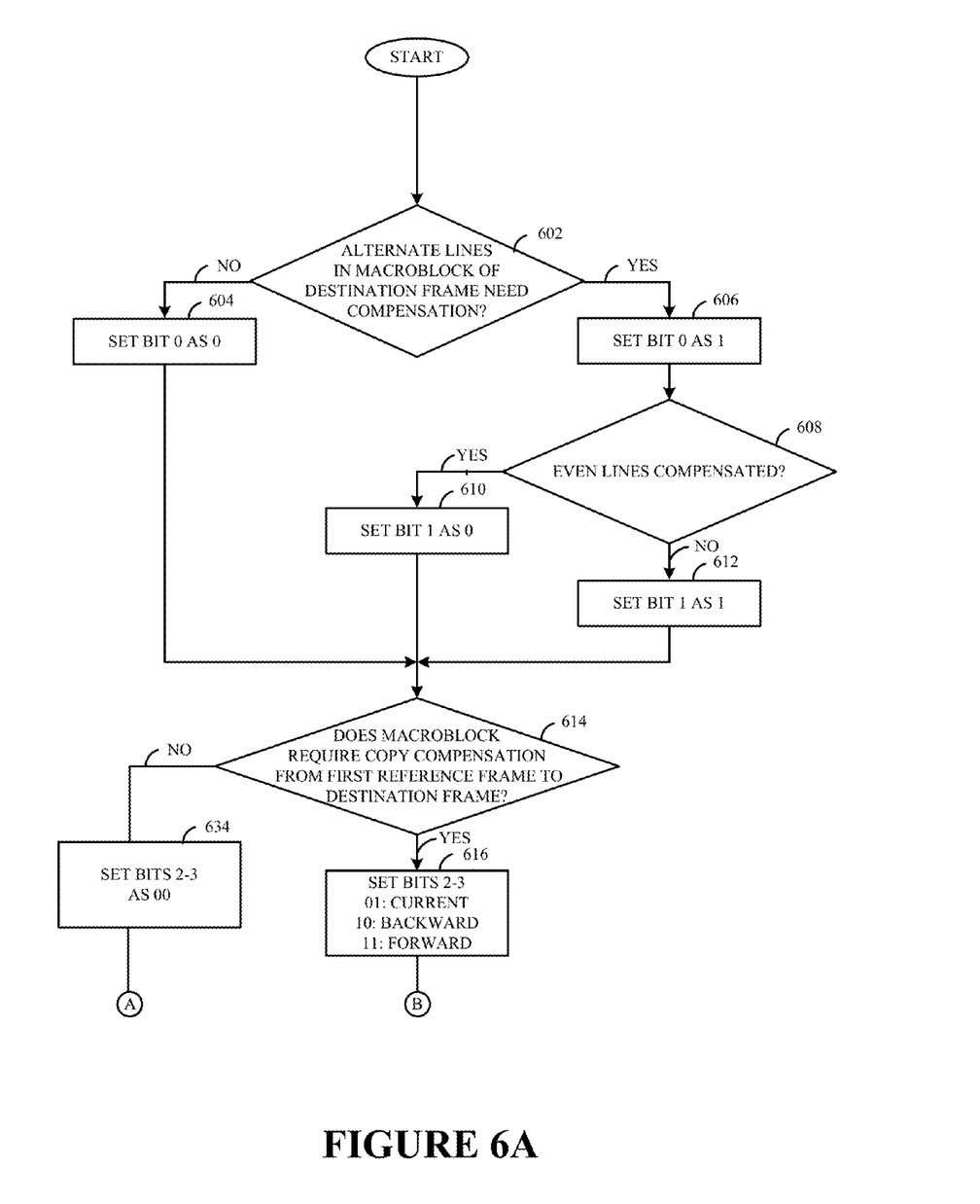
FIG. 6A is a flowchart detailing the operations involved in determining the eight bit-assignments, in accordance with one or more embodiments.
Figure 6B:
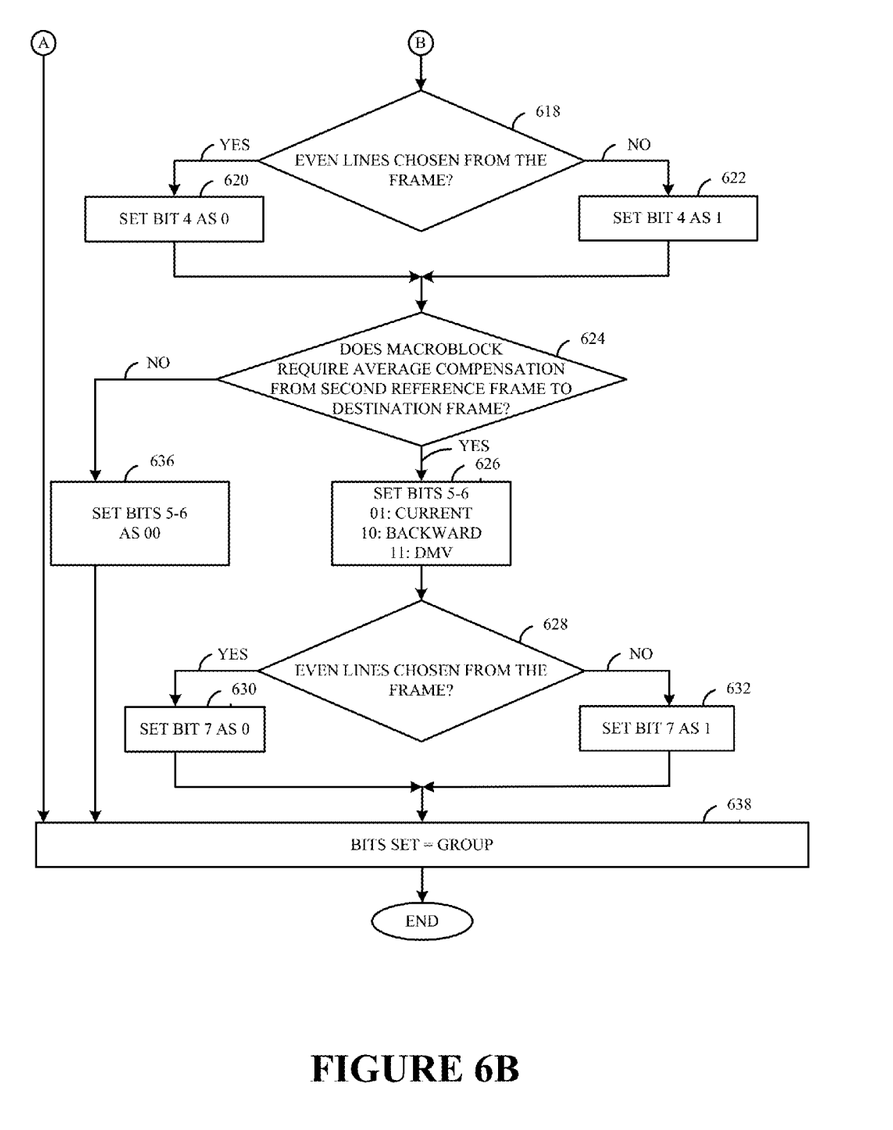
FIG. 6B is a continuation of the flowchart of FIG. 6A, illustrating additional operations, in accordance with one or more embodiments.

FIGS. 6A and 6B show a flowchart detailing the operations involved in determining the eight bit-assignments, in accordance with one or more embodiments. In operation 602, a check may be done as to whether alternate lines (even lines or odd lines) in a macroblock of the destination frame need compensation. If no, bit 0 may be set to 0 in operation 604, or, if yes, bit 0 may be set to 1 in operation 606. In operation 608, a check may be done as to whether even lines may be compensated. If yes, bit 1 may be set as 0 in operation 610, or, if no, bit 1 may be set as 1 in operation 612.

Operation 614 may involve a check as to whether a copy compensation is required from a macroblock of the first reference frame to the macroblock of the destination frame. If yes, bits 2-3 may be set as 01, 10, and 11 in operation 616 depending on the states as shown in FIG. 6A. Operation 618 may involve a check as to whether even lines may be chosen from the macroblock of the first reference frame. If no, bit 4 may be set as 1 in operation 622, or, if yes, bit 4 may be set as 0 in operation 620.

Operation 624 may involve a check as to whether an average compensation from a macroblock of the second reference frame to the macroblock of the destination frame is required. If yes, bits 5-6 may be set as 01, 10, and 11 in operation 626 depending on the states as shown in FIG. 6B. Operation 628 may involve a check as to whether even lines may be chosen from the second reference frame. If yes, bit 7 may be set as 0 in operation 630, or, if no, bit 7 may be set as 1 in operation 632.

If the checks at operation 614 and operation 624 yield a no at each operation, bits 2-3, and bits 5-6 may each be set as 00 at operation 634 and 636 respectively. Thus, the eight bits may be set at operation 638. The bits set may represent a group of macroblocks having the same reference parameters defining compensation requirements.

The eight bits may lead to an indexed array of linked-lists being constructed using the driver. The array may be indexed from a 0 to a number N, where N<=255, as some of the 256 possible combinations may be invalid due to the reasons set forth above. In one or more embodiments, macroblocks may be reconstructed in the grouped order from 0 to N.

Figure 7:
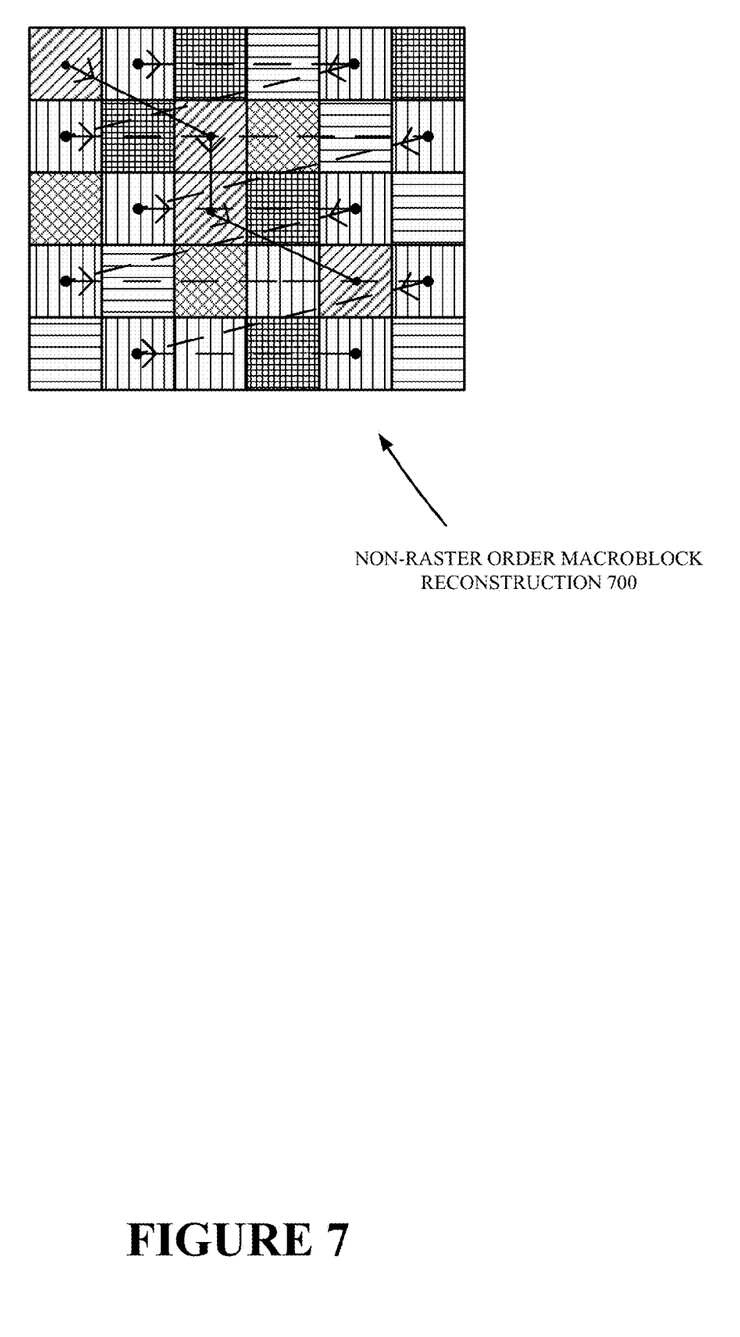
FIG. 7 is a schematic of a non-raster macroblock reconstruction process, in accordance with one or more embodiments.

FIG. 7 shows a non-raster macroblock reconstruction 700 process, in accordance with one or more embodiments. As shown in FIG. 7, macroblocks having the same reference parameters (shown as like boxes) are traversed group-wise during reconstruction.

Figure 8:
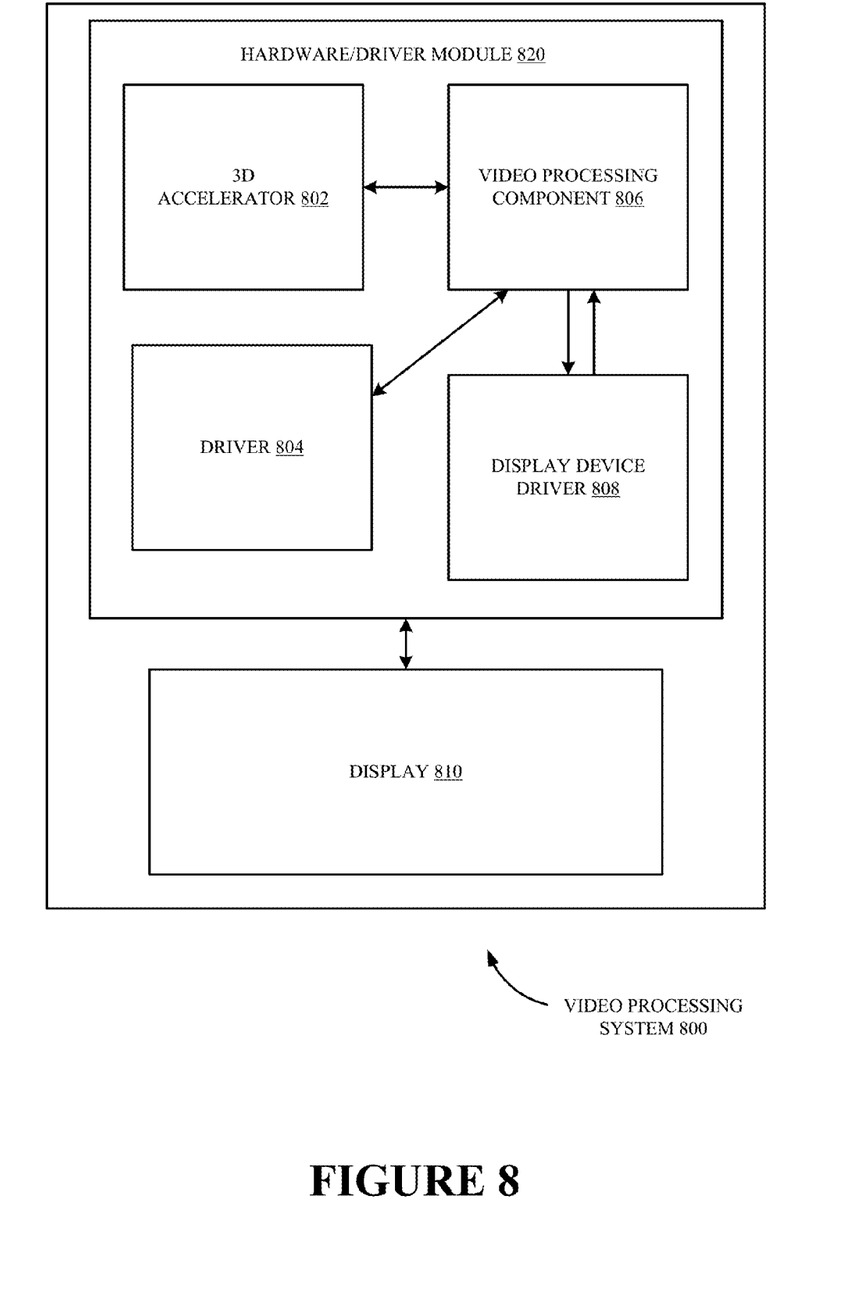
FIG. 8 is a video processing system, in accordance with one or more embodiments.

FIG. 8 shows a video processing system 800, in accordance with one or more embodiments. The video processing system 800 may include a hardware/driver module 820 interfaced with a display 810. In one or more embodiments, the hardware/driver module 820 may include a 3D accelerator 802 that may interface with a video processing component 806. A driver 804 for the video processing component 806 may also be provided. In one or more embodiments, a display device driver 808 of the hardware/driver module 820 may interface with the video processing component 806 to enable a video file or a video file stream to be rendered on the display 810. In one embodiment, video stream rendering may involve access to interconnected computer networks (e.g., Internet). In one or more embodiments, the video processing system 800 may be a mobile phone, a digital media player or a portable media player. In one embodiment, the mobile phone may be used to broadcast digital television (TV). In one or more embodiments, the 3D accelerator 802 may be a 3D hardware accelerator such as a pixel shader or a graphics card. In one or more embodiments, the video processing system 800 may be compatible with a plurality of video formats (e.g., MPEG-2, H.264, MPEG-4, MPEG-1).

As discussed above, the driver 804 may be used to segment macroblocks of the destination frame in a raster order into groups based on reference parameters thereof. The reference parameters may define compensation needs of macroblocks of the destination frame. In one or more embodiments, an indexed array of linked-lists may be constructed using the driver 804, where each linked-list may represent macroblocks of a group having the same reference parameters. In one or more embodiments, the 3D accelerator 802 may be programmed to accelerate motion compensation by reconstructing macroblocks of the destination frame group-wise in the indexed order of the array of linked-lists.

In one or more embodiments, the grouping of macroblocks may involve lesser state changes in the 3D hardware during reconstruction as compared to a conventional raster-order macroblock reconstruction process. Taking the example of D1 interlaced video decoding with a resolution of 720×480, and a 16×16 sample macroblock, the number of macroblocks involved in the conventional raster-order reconstruction process may be (720×480)/(16×16)=1350. The worst case may involve two 16×8 compensations for each macroblock, thereby implying 1350×2=2700 state changes per frame. Empirically, ~1500-2000 state changes per frame may be expected.

Taking the example of non-raster macroblock reconstruction, in accordance with one or more embodiments, the worst case may involve 256 state changes per frame (<256 in actuality, as some of the bit combinations may be invalid as described above). Empirically, ~20 state changes per frame may be expected. Therefore, one or more embodiments may provide for improved performance of a video processing system including the abovementioned grouping of macroblocks during video reconstruction, with lesser power consumption compared to a video processing system including the conventional raster-order macroblock reconstruction process. In one embodiment, performance improvement may be in the order of 20% for an MPEG-2 interlaced sequence at 10 megabits per second (Mbps) and 30 frames per second (fps).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of video reconstruction comprising:
providing a hardware accelerator to a video processing component of a video processing system;
providing a driver for the video processing component;
segmenting macroblocks of a destination video frame in a raster order into distinct groups based on similarity of reference parameters thereof using the driver, the reference parameters defining compensation needs of macroblocks of the destination video frame;
constructing an indexed array of linked-lists using the driver following the segmentation of the macroblocks of the destination video frame, each linked-list representing macroblocks of a distinct group having the same reference parameters; and
programming the hardware accelerator to accelerate motion compensation by reconstructing the macroblocks of the destination video frame group-wise in the indexed order of the array of linked-lists instead of the raster order.

2. The method of claim 1, comprising providing a 3D accelerator as the hardware accelerator to the video processing component of the video processing system.

3. The method of claim 1, comprising providing a 3D pixel shader for hardware acceleration of the video processing component of the video processing system.

4. The method of claim 1, wherein segmenting macroblocks of the destination video frame into distinct groups includes utilizing an N-bit encoding scheme to group macroblocks of the destination video frame according to the reference parameters, wherein N is a positive integer.

5. The method of claim 1, wherein the reference parameters include:
   a first reference surface copy, denoting a copy requirement of a macroblock of a first reference frame to a macroblock of the destination video frame for compensation;
   a first reference surface offset, denoting a compensation involving copying one of a top field and a bottom field of the macroblock of the first reference frame when the first reference frame is one of an interlaced picture encoded as a frame picture and an interlaced picture encoded as a field picture;
   a second reference surface average, denoting an averaging requirement of the macroblock of the first reference frame with a macroblock of a second reference frame for compensation;
   a second reference surface offset, denoting a compensation involving averaging the one of the top field and the bottom field of the macroblock of the first reference frame with one of a top field and a bottom field of the macroblock of the second reference frame when the first reference frame and the second reference frame are one of interlaced frames encoded as frame pictures and interlaced frames encoded as field pictures;
   an output offset, denoting a compensation involving one of a top field and a bottom field of the macroblock of the destination video frame; and
   an output stride, denoting a requirement of doubling a stride of each of two macroblocks of even lines and odd lines of an interlaced picture to compensate the macroblock of the destination video frame,
      wherein doubling the stride is not required for a compensation involving a progressive picture.

6. The method of claim 5, further comprising utilizing an 8-bit encoding scheme to group macroblocks of the destination video frame according to the reference parameters.

7. The method of claim 5, further comprising utilizing an N-bit encoding scheme to group macroblocks of the destination video frame according to the reference parameters, wherein N>8.

8. The method of claim 6, wherein the 8-bit encoding scheme includes allotting two bits each to the first reference surface copy and the second reference surface average, and allotting one bit each to the first reference surface offset, the second reference surface offset, the output offset, and the output stride for MPEG-2 video reconstruction.

9. The method of claim 8, wherein when intra-macroblock compensation is required in the destination video frame, the first reference surface copy, the first reference surface offset, the second reference surface average, and the second reference surface offset are appropriately encoded to represent an invalid state thereof to signify a lack of need of both the first reference frame and the second reference frame.

10. The method of claim 8,
   wherein one of a top field picture and a bottom field picture is used to copy compensate the other of a bottom field picture and a top field picture in a current frame, and
   wherein the first reference surface copy is appropriately encoded to indicate a copy compensation of the other of the bottom field picture and the top field picture in the current frame.

11. The method of claim 8,
   wherein one of a top field picture and a bottom field picture is used to compensate the other of a bottom field picture and a top field picture in a current frame by averaging, and
   wherein the second reference surface average is appropriately encoded to indicate the compensation by averaging of the other of the bottom field picture and the top field picture in the current frame.

12. The method of claim 8, comprising encoding the first reference surface copy for one of a compensation of a macroblock of a destination bi-predictive (B-) frame using the macroblock of the first reference frame in a temporal future relative to the macroblock of the destination B-frame and a compensation of a macroblock of one of a destination predictive (P-) frame and a destination B-frame using the macroblock of the first reference frame in a temporal past relative to the macroblock of one of the destination P-frame and the destination B-frame.

13. The method of claim 12, wherein the macroblock of one of the destination B-frame and the destination P-frame is predicted from the macroblock of the first reference frame during compensation through a use of a motion vector, representing the macroblock of one of the destination B-frame and the destination P-frame and pointing from one of the destination B-frame and the destination P-frame to the first reference frame.

14. The method of claim 12, comprising encoding the second reference surface average for a compensation of the macroblock of the destination B-frame using the macroblock of the first reference frame in one of a temporal future and a temporal past relative to the destination B-frame and using the macroblock of the second reference frame in the other of the temporal past and the temporal future relative to the destination B-frame,
   wherein compensation of the macroblock of the destination B-frame is achieved through the use of motion vectors that point from the destination B-frame to both the first reference frame and the second reference frame.

15. The method of claim 14, comprising encoding the second reference surface average for a compensation of the macroblock of the destination P-frame using both the macroblock of the first reference frame and the macroblock of the second reference frame in a temporal past relative to the macroblock of the destination P-frame through the use of a motion vector, pointing from the macroblock of the destination P-frame to the macroblock of the reference frame spatially nearest to the destination P-frame, to which a differential motion vector (DMV) is added to enable the macroblock of the destination P-frame to point to the macroblock of the reference frame spatially farthest to the destination P-frame.

16. The method of claim 12, comprising encoding the second reference surface average for compensation of one of field pictures and interlaced frame pictures using a DMV.

17. A method comprising:
   dividing macroblocks of a destination video frame in a raster order into distinct groups based on similarity of reference parameters thereof,
   wherein the reference parameters define compensation needs of macroblocks of the destination video frame, and
   wherein the reference parameters include:
      a first reference surface copy, denoting a copy requirement of a macroblock of a first reference frame to a macroblock of the destination video frame for compensation;

a first reference surface offset, denoting a compensation involving copying one of a top field and a bottom field of the macroblock of the first reference frame when the first reference frame is one of an interlaced picture encoded as a frame picture and an interlaced picture encoded as a field picture;

a second reference surface average, denoting an averaging requirement of the macroblock of the first reference frame with a macroblock of a second reference frame for compensation;

a second reference surface offset, denoting a compensation involving averaging the one of the top field and the bottom field of the macroblock of the first reference frame with one of a top field and a bottom field of the macroblock of the second reference frame when the first reference frame and the second reference frame are one of interlaced frames encoded as frame pictures and interlaced frames encoded as field pictures;

an output offset, denoting a compensation involving one of a top field and a bottom field of the macroblock of the destination video frame; and an output stride, denoting a requirement of doubling a stride of each of two macroblocks of even lines and odd lines of an interlaced picture to compensate the macroblock of the destination video frame, wherein doubling the stride is not required for a compensation involving a progressive picture; and reconstructing the macroblocks of the destination video frame group-wise based on the division instead of the raster order.

18. The method of claim 17, further comprising utilizing an 8-bit encoding scheme to distinctly group macroblocks of the destination video frame according to the reference parameters.

19. The method of claim 17, further comprising utilizing an N-bit encoding scheme to group macroblocks of the destination video frame according to the reference parameters, wherein N>8.

20. The method of claim 18, wherein the 8-bit encoding scheme includes allotting two bits each to the first reference surface copy and the second reference surface average, and allotting one bit each to the first reference surface offset, the second reference surface offset, the output offset, and the output stride for MPEG-2 video reconstruction.

21. A video processing system comprising:
a video processing component;
a hardware accelerator to the video processing component; and
a driver for the video processing component,
wherein the driver is used to segment macroblocks of a destination video frame in a raster order into distinct groups based on similarity of reference parameters thereof, the reference parameters defining compensation needs of macroblocks of the destination video frame,
wherein the driver is used to construct an indexed array of linked-lists following the segmentation of the macroblocks of the destination video frame, each linked-list representing macroblocks of a distinct group having the same reference parameters, and
wherein the hardware accelerator is programmed to accelerate motion compensation by reconstructing the macroblocks of the destination video frame group-wise in the indexed order of the array of linked-lists instead of the raster order.

22. The video processing system of claim 21, further comprising an N-bit encoding scheme to distinctly group macroblocks of the destination video frame according to the reference parameters, wherein N is a positive integer.

23. The video processing system of claim 21, wherein the hardware accelerator to the video processing component is a graphics card.

24. The video processing system of claim 21, wherein the video processing system is a portable media player.

25. The video processing system of claim 21, wherein the video processing system is a mobile phone.

26. The video processing system of claim 21, wherein a video input to the video processing system is one of a video file and a video file stream.

* * * * *